US007573859B2

(12) United States Patent
Taylor

(10) Patent No.: US 7,573,859 B2
(45) Date of Patent: Aug. 11, 2009

(54) SYSTEM AND METHOD FOR REMOTE MONITORING IN A WIRELESS NETWORK

(75) Inventor: Ron Taylor, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 590 days.

(21) Appl. No.: 11/326,966

(22) Filed: Jan. 5, 2006

(65) Prior Publication Data

US 2007/0086397 A1 Apr. 19, 2007

Related U.S. Application Data

(60) Provisional application No. 60/727,025, filed on Oct. 13, 2005.

(51) Int. Cl.
*G06F 15/00* (2006.01)

(52) U.S. Cl. ...................... 370/338; 370/252

(58) Field of Classification Search ............... 370/232, 370/252, 338, 352, 389; 455/410, 411; 726/5, 726/12, 25
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRoas et al. |
| 4,247,908 A | 1/1981 | Lockart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |

(Continued)

FOREIGN PATENT DOCUMENTS

WO          WO94/03986          2/1994

(Continued)

OTHER PUBLICATIONS

U.S. Appl. No. 11/330,877, filed Jan. 11, 2006, Matta.

(Continued)

*Primary Examiner*—Sam Bhattacharya
(74) *Attorney, Agent, or Firm*—Perkins Coie LLP

(57) ABSTRACT

A technique for combining operations of a wireless access point with a remote probe. An access point links a wireless client to a wireless switch. A remote probe captures wireless packets, appends radio information, and forwards packets to a remote observer for analysis. In an embodiment, the observer may provide a protocol-level debug. A system according to the technique can, for example, accomplish concurrent in-depth packet analysis of one or more interfaces on a wireless switch. The system can also, for example, augment embedded security functions by forwarding selected packets to a remote Intrusion Detection System (IDS). In an embodiment, filters on the probes may reduce overhead.

20 Claims, 5 Drawing Sheets

U.S. PATENT DOCUMENTS

| | | | |
|---|---|---|---|
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,418,812 A | 5/1995 | Reyes et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,078,568 A | 6/2000 | Wright |
| 6,088,591 A | 7/2000 | Trompower |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewki et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,285,662 B1 | 9/2001 | Watannabe et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ata-Laurila et al. |
| 6,614,787 B1 | 9/2003 | Jain et al. |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,687,498 B2 | 2/2004 | McKenna et al. |
| 6,725,260 B1 | 4/2004 | Philyaw |
| 6,747,961 B1 | 6/2004 | Ahmed et al. |
| 6,839,338 B1 | 1/2005 | Amara et al. |
| 6,879,812 B2 | 4/2005 | Agrawal et al. |
| 6,973,622 B1 | 12/2005 | Rappaport et al. |
| 6,978,301 B2 | 12/2005 | Tindal |
| 7,020,773 B1 | 3/2006 | Otway et al. |
| 7,110,756 B2 | 9/2006 | Diener |
| 2002/0052205 A1 | 5/2002 | Belostofsky et al. |
| 2002/0080752 A1 | 6/2002 | Forslow et al. |
| 2002/0095486 A1 | 7/2002 | Bahl |
| 2002/0101868 A1 | 8/2002 | Clear et al. |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0107590 A1 | 6/2003 | Levillain et al. |
| 2003/0174706 A1 | 9/2003 | Shankar et al. |
| 2004/0025044 A1 | 2/2004 | Day |
| 2004/0047320 A1 | 3/2004 | Eglin |
| 2004/0064560 A1 | 4/2004 | Zhang et al. |
| 2004/0095914 A1 | 5/2004 | Katsube et al. |
| 2004/0095932 A1 | 5/2004 | Astarabadi et al. |
| 2004/0143428 A1 | 7/2004 | Rappaport et al. |
| 2004/0230370 A1 | 11/2004 | Tzamaloukas |
| 2004/0259555 A1 | 12/2004 | Rappaport et al. |
| 2005/0030929 A1 | 2/2005 | Swier et al. |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0128989 A1 | 6/2005 | Bhagwat et al. |
| 2005/0157730 A1 | 7/2005 | Grant et al. |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0240665 A1 | 10/2005 | Gu et al. |
| 2005/0259597 A1 | 11/2005 | Benedetotto et al. |
| 2005/0273442 A1 | 12/2005 | Bennett |
| 2005/0276218 A1 | 12/2005 | Ooghe et al. |
| 2006/0045050 A1 | 3/2006 | Floros et al. |

| | | | |
|---|---|---|---|
| 2006/0161983 A1* | 7/2006 | Cothrell et al. | 726/23 |
| 2006/0200862 A1 | 9/2006 | Olson et al. | |
| 2007/0083924 A1* | 4/2007 | Lu | 726/13 |

FOREIGN PATENT DOCUMENTS

| | | |
|---|---|---|
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/331,789, filed Jan. 14, 2006, Matta et al.
U.S. Appl. No. 11/351,104, filed Feb. 8, 2006, Tiwari.
U.S. Appl. No. 11/377,859, filed Mar. 15, 2006, Harkins.
U.S. Appl. No. 11/400,165, filed Apr. 5, 2006, Tiwari.
U.S. Appl. No. 11/445,750, filed May 3, 2006, Matta.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Tress at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30- Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007 Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for MANET. In *Proceedings of the Ninth international Symposium on Computers and Communications 2004 vol. 2 (Iscc"04)*—vol. 02 (Jun. 28-Jul. 1, 2004). ISCC. IEEE Computer Society, Washington, DC, 331-338.

* cited by examiner

SYSTEM AND METHOD FOR REMOTE MONITORING IN A WIRELESS NETWORK

CROSS-REFERENCE TO RELATED APPLICATIONS

This application claims the benefit of U.S. Provisional Application No. 60/727,025 filed on Oct. 13, 2005, which is incorporated by reference.

BACKGROUND

In order to debug client issues in a wireless network, there's a general need for packet sniffing. For wired clients, this is handled by port mirroring or using hubs.

Wireless clients typically use sniffers near an access point to capture sessions, but this is inconvenient, inaccurate, and may be unavailable if data is encrypted. For example, there is typically guesswork when matching probes and access points, and capturing encrypted packets in the clear is difficult or impossible using standard prior art techniques. A sniffer is typically needed at each access point. Embedded analysis for intrusion detection is limited because the switch is busy forwarding packets.

Raw 802.11 packet capture is not sufficient for wireless debug. It's also useful to see information from the radio including channel, signal strength, etc. The Prism header adds this info for a local wireless interface. Tazmen Sniffer Protocol (TZSP) adds this info to 802.11 packets from a remote probe. TZSP is typically used for remote monitoring devices used for intrusion detection.

A remote probe with TZSP will capture all info required for network debug, but it's not practical to deploy a probe next to each access point when debugging a roaming client. Also, the RF environment of two adjacent devices is not identical.

Packet protocol decode of 802.11 packets including TZSP is widely available. Ethereal® and Wildpackets Airopeek® are popular solutions.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for packet sniffing involves remote monitoring, which facilitates mirroring selected traffic on a radio interface to a packet analyzer (or observer). A system according to the technique can accomplish in-depth packet analysis using network probes paired with a remote Intrusion Detection System (IDS). Filters on the probes can reduce overhead.

By embedding the core features of a remote probe into the access point, we have an optimal solution for network debug. We also have an inexpensive solution for an IDS.

The proposed system can offer, among other advantages, convenient analysis of captured packets from a remote location. These and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
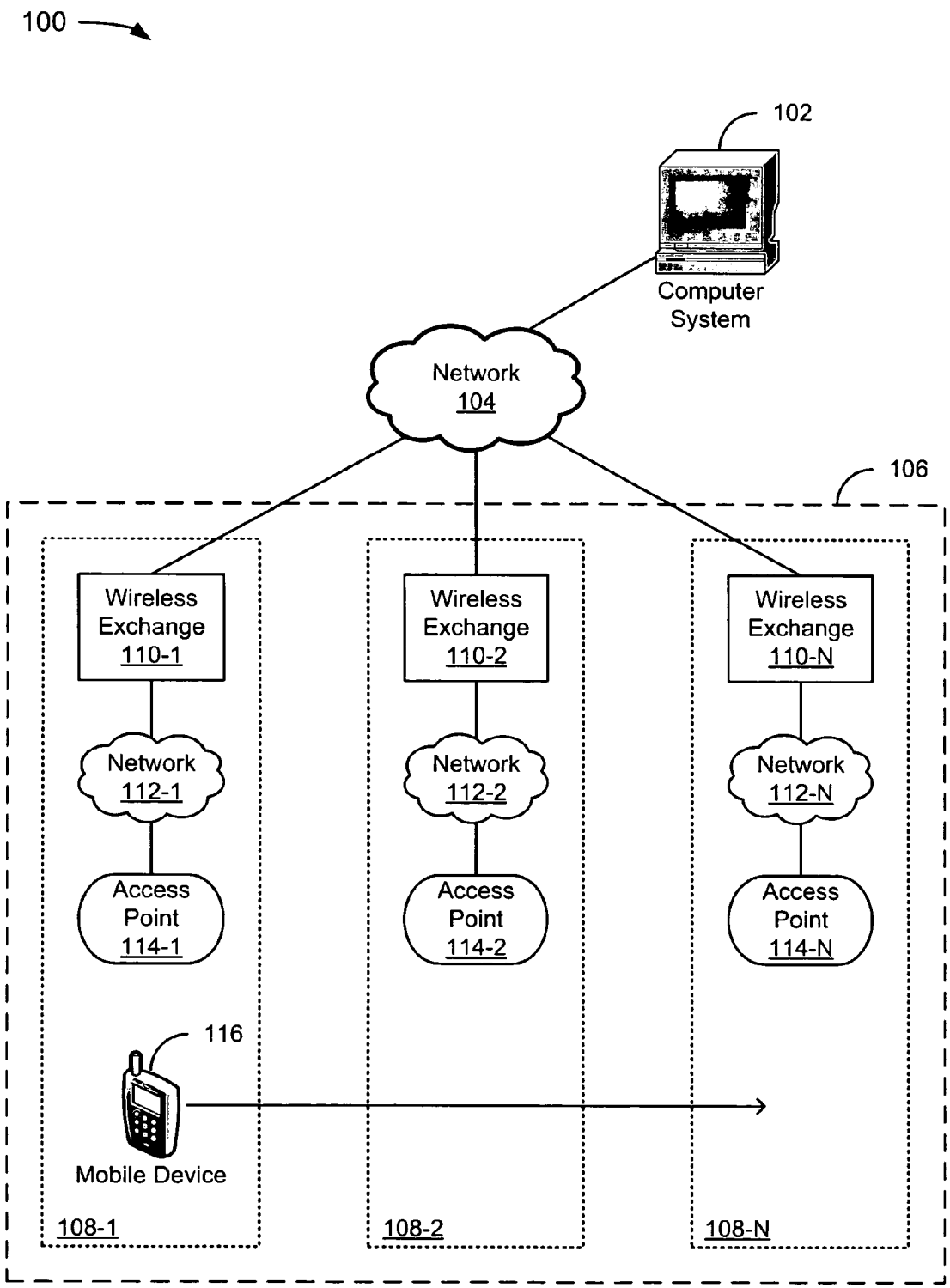
FIG. 1 depicts a system including a wireless access domain.

FIG. 1 depicts a system 100 including a wireless access domain. The system 100 includes a computer system 102, a network 104, and a wireless access domain 106. The system 100 may or may not include multiple wireless access domains. The computer system 102 may be practically any type of device that is capable of communicating with a communications network, such as, by way of example but not limitation, a workstation. The network 104 may be practically any type of communications network, such as, by way of example but not limitation, the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the computer system 102 may be running a program such as, by way of example but not limitation, ethereal, to decode, by way of example but not limitation, IEEE 802.11 standard packets encapsulated in TZSP that are received from the wireless access domain 106. In a non-limiting embodiment, the computer system 102 is connected to a wireless backbone network (not shown), either directly or indirectly through a wireless network.

In a non-limiting embodiment, the network 104 provides a Layer 2 path for Layer 3 traffic, preserving IP addresses, sessions, and other wired Layer 3 attributes as users roam throughout the wireless access domain 106. The network may or may not include a wireless backbone network, or be connected directly or indirectly to a wireless backbone network. Communications between the computer system 102 and the wireless access domain 106 are, therefore, Layer 3 traffic tunneled through Layer 2. Advantageously, by tunneling Layer 3 traffic at Layer 2, users stay connected with the same IP address and keep the same security and Quality of Service (QoS) policies from the wired network while they roam the wireless side. Since Layer 3 attributes are maintained, mobile devices that are connected to the wireless access domain 106 can retain persistent identities.

The seven layers of the Open System Interconnection (OSI) model, of which Layers 2 and 3 are a part, are well-known to those of skill in the relevant art, and are, therefore, not described herein in any substantial detail. It should be noted, however, that Layer 3 is known as the "Network Layer" because it provides switching and routing technologies, creating logical paths, known as virtual circuits, for transmitting data from node to node. Routing and forwarding are functions of this layer, as well as addressing, internetworking, error handling, congestion control and packet sequencing. Layer 2 is known as the "Data Link Layer" because at Layer 2 data packets are encoded and decoded into bits; and Layer 2 furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control, and error checking.

In non-limiting embodiments, the wireless access domain 106 may be referred to as, by way of example but not limitation, a Local Area Network (LAN), virtual LAN (VLAN), and/or wireless LAN (WLAN). The wireless access domain 106 gives each user a persistent identity that can be tracked and managed, no matter where they roam. The wireless access domain 106 may have one or more associated snoop filters, which are described later with reference to FIG. 3. In an embodiment, the wireless access domain 106 may include one or more radios.

In the example of FIG. 1, the wireless access domain 106 includes access areas 108-1 to 108-N (hereinafter collectively referred to as access areas 108). The access areas 108 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 108. In another embodiment, a few parameters, such as the radio name and channel number, must be set separately for each radio. An example of the implementation of a wireless access domain, provided by way of example but not limitation, includes a Trapeze Networks "identity-aware" Mobility Domain™.

In the example of FIG. 1, the following elements are associated with each of the access areas 108: Wireless exchange switches 110-1 to 110-N (hereinafter collectively referred to as wireless exchange switches 110), networks 112-1 to 112-N (hereinafter collectively referred to as networks 112), and access points 114-1 to 114-N (hereinafter collectively referred to as access points 114).

In an embodiment, the wireless exchange switches 110 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). In an embodiment, the wireless exchange switches 110 provide forwarding, queuing, tunneling, and/or some security services for the information the wireless exchange switches 110 receive from their associated access points 114. In another embodiment, the wireless exchange switches 110 coordinate, provide power to, and/or manage the configuration of the associated access points 114. An implementation of a wireless exchange switch, provided by way of example but not limitation, includes a Trapeze Networks Mobility Exchange™ switch. The Trapeze Networks Mobility Exchange™ switches may, in another implementation, be coordinated by means of the Trapeze Access Point Access (TAPA) protocol.

In an embodiment, the networks 112 are simply wired connections from the wireless exchange switches 110 to the access points 114. The networks 112 may or may not be part of a larger network. In a non-limiting embodiment, the networks 112 provides a Layer 2 path for Layer 3 traffic, preserving IP addresses, sessions, and other wired Layer 3 attributes as users roam throughout the wireless access domain 106. Advantageously, by tunneling Layer 3 traffic at Layer 2, users stay connected with the same IP address and keep the same security and Quality of Service (QoS) policies from the wired network while they roam the wireless side.

In a non-limiting embodiment, the access points 114 are hardware units that act as a communication hub by linking wireless mobile 802.11 stations such as PCs to a wired backbone network. In an embodiment, the access points 114 connect users to other users within the network and, in another embodiment, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System™ Mobility Point™ (MP™) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting embodiment, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the access points 114 are stations. Similarly, the wireless client 116 may be implemented as a station. In alternative embodiments, a station may comply with a different standard than IEEE 802.11, and may have different interfaces to a wireless or other medium.

In operation, a wireless client 116 can roam from one of the access areas 108 to another of the access areas 108. For example, in the example of FIG. 1 the wireless client 116 moves from the access area 108-1 to the access area 108-N. In an embodiment, the wireless client 116 can maintain a single IP address and associated data sessions. The ability of the wireless client 116 to roam across the access areas 108 while maintaining a single IP address and associated data sessions may be referred to as subnet mobility. Advantageously, the system 100 may be implemented using identity-based networking, which is a technique that enforces network authorization attributes to the wireless client 116 based on client identity rather than the port or device through which the wireless client 116 connects to the network. This technique enables both a single persistent login and passport free roaming which permits the introduction of services such as voice to a wireless LAN.

Figure 2:
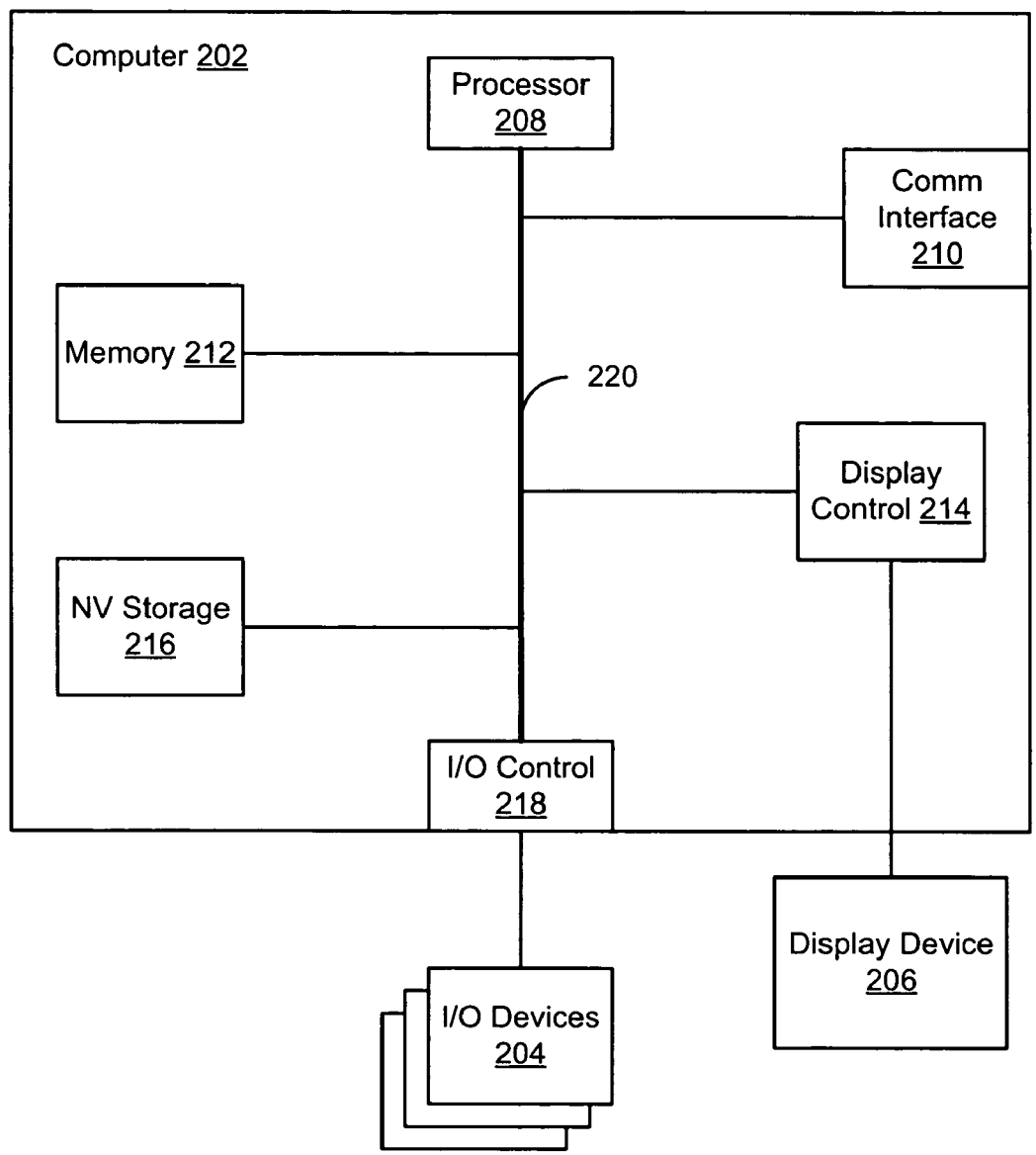
FIG. 2 depicts a computer system for use in the system of FIG. 1.

FIG. 2 depicts a computer system 200 for use in the system 100 (FIG. 1). The computer system 200 may be a conventional computer system that can be used as a client computer system, such as a wireless client or a workstation, or a server computer system. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. It will be appreciated that the communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems.

The processor 208 may be, for example, a conventional microprocessor such as an Intel Pentium microprocessor or Motorola power PC microprocessor. The memory 212 is coupled to the processor 208 by a bus 220. The memory 212 can be Dynamic Random Access Memory (DRAM) and can also include Static RAM (SRAM). The bus 220 couples the processor 208 to the memory 212, also to the non-volatile storage 216, to the display controller 214, and to the I/O controller 218.

The I/O devices 204 can include a keyboard, disk drives, printers, a scanner, and other input and output devices, including a mouse or other pointing device. The display controller 214 may control in the conventional manner a display on the display device 206, which can be, for example, a cathode ray tube (CRT) or liquid crystal display (LCD). The display controller 214 and the I/O controller 218 can be implemented with conventional well known technology.

The non-volatile storage 216 is often a magnetic hard disk, an optical disk, or another form of storage for large amounts of data. Some of this data is often written, by a direct memory access process, into memory 212 during execution of software in the computer 202. One of skill in the art will immediately recognize that the terms "machine-readable medium" or "computer-readable medium" includes any type of storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

In addition, the computer system 200 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 216 and causes the processor 208 to execute the various acts required by the operating system to input and output data and to store data in memory, including storing files on the non-volatile storage 216.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 3:
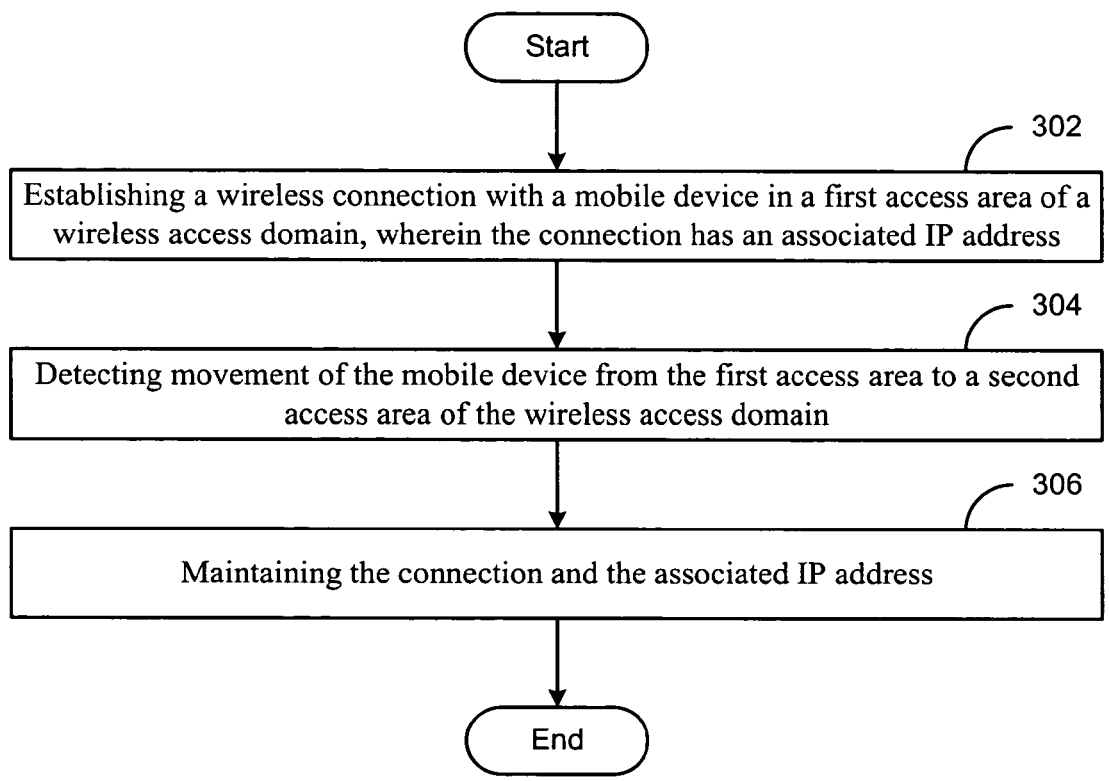
FIG. 3 depicts a flowchart of a method for mobility in a wireless network.

FIG. 3 depicts a flowchart 300 of a method for mobility in a wireless network. This method and other methods are depicted as serially arranged modules. However, modules of the methods may be reordered, or arranged for parallel execution as appropriate. FIG. 3 is intended to illustrate subnet mobility using the techniques described herein, such as tunneling Layer 3 traffic at Layer 2.

In the example of FIG. 3, the flowchart 300 starts at module 302 with establishing a wireless connection with a mobile device in a first access area of a wireless access domain, wherein the connection has an associated IP address. The flowchart continues at module 304 with detecting movement of the mobile device from the first access area to a second access area of the wireless access domain. The flowchart ends at module 306 with maintaining the connection and the associated IP address.

Figure 4:
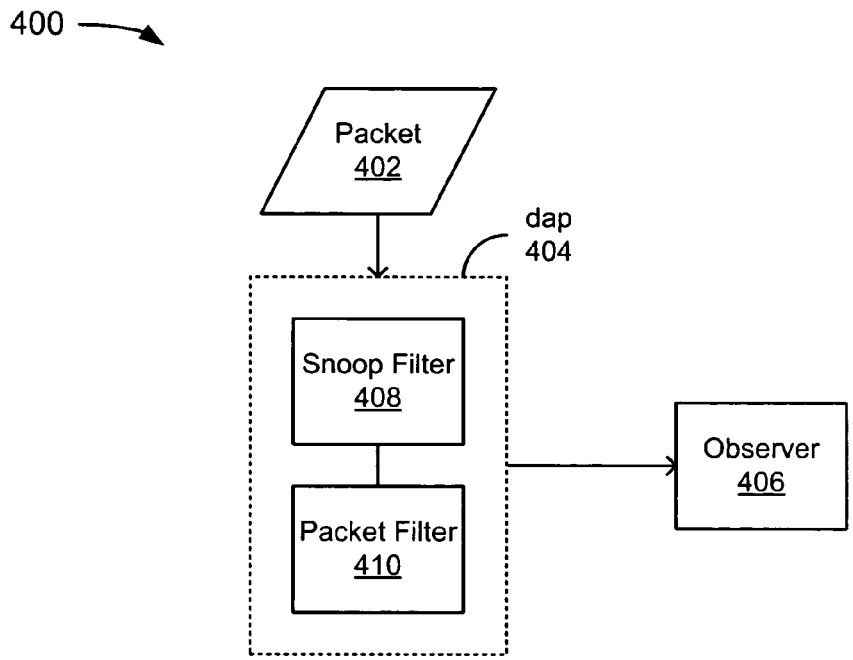
FIG. 4 depicts a system for remote monitoring in a wireless network.

FIG. 4 depicts a system 400 for remote monitoring in a wireless network. In the example of FIG. 4, the system 400, when in operation, includes traffic including, for illustrative purposes, a packet 402. The system 400 also includes a dap 404 and an observer 406. Directory Access Protocol (DAP) is part of X.500, a standard for directory services in a network. Those of skill in the relevant art occasionally refer to a "dap" as a networked directory structure and the elements used to monitor and manipulate the directory structure; this convention is used hereinafter. In the example of FIG. 4, the dap 404 includes a snoop filter 408 and a packet filter 410.

When the dap 404 sees a matching packet, it copies the packet 402 and sends it to the observer 406. In some cases, a snooped packet will flow directly from the dap 404 to the observer 406 without passing through a wireless exchange switch (see, e.g., FIG. 1). In an embodiment, a valid source IP address is needed to send packets from the dap 404 to the observer 406.

In an embodiment, ethereal (e.g., ethereal 0.10.8 or later) may be installed on the observer 406. Ethereal (and, as another example, tethereal) decode 802.11 packets embedded in TZSP without any configuration. Netcat, for example, may also be installed on the observer 406, which allows the observer 406 to listen to UDP packets on the TZSP port. If running on a computer, a tcl script can be used instead.

In an embodiment, the snoop filter 408 is persistent. However, the enabled state of the snoop filter 408 is not persistent. In an alternative embodiment, it may be desirable to allow enabled state of the snoop filter 408 to be persistent.

In operation, the snoop filter 408 may selectively capture the packet 402. The packet may be, by way of example but not limitation, an 802.11 packet. If the packet 402 matches the packet filter 410, the snoop filter 408 copies the packet 402 to the observer 406. In this way, the packet filter 410 can be used to block uninteresting traffic from the observer 406. In an embodiment, the packet filter 410 can also be used to block uninteresting portions of packets from the observer (e.g., send headers without any payload). The observer 406 is specified by the IP address of the host that will receive the packet 402. In a non-limiting embodiment, it may be desirable to restrict observer ip-addr selection to prevent snoop packets from using the radio interface.

Figure 5:
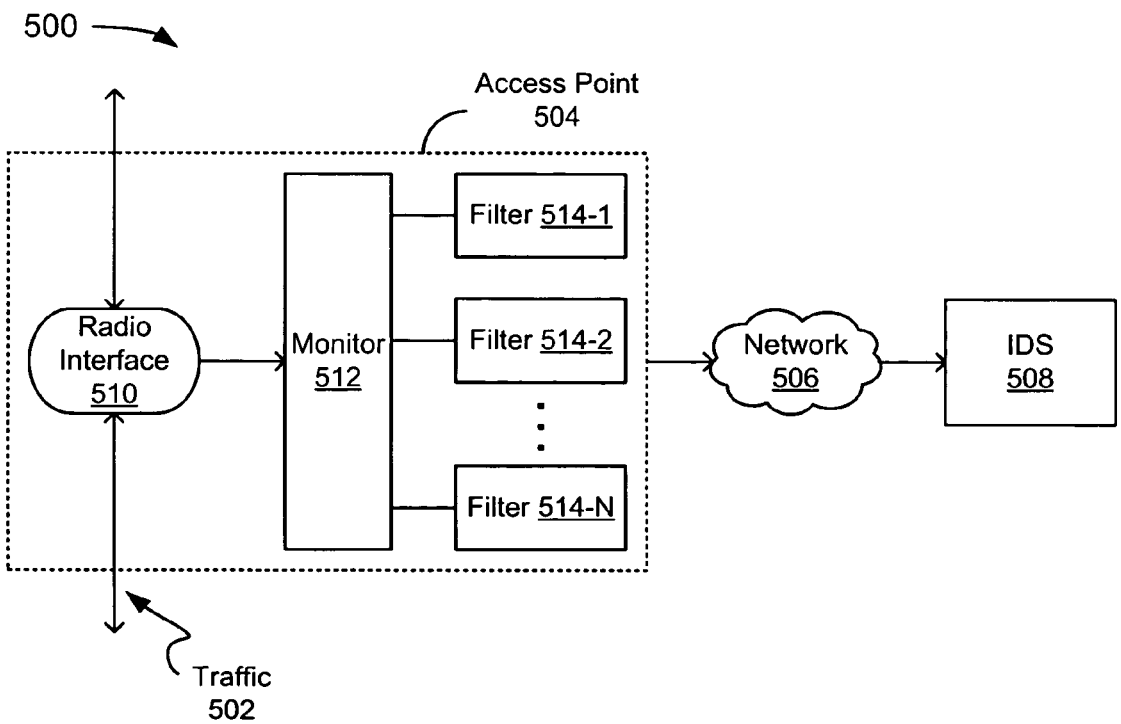
FIG. 5 depicts a system for remote monitoring in a wireless network.

FIG. 5 depicts a system 500 for remote monitoring in a wireless network. The system 500 includes an access point 504, a network 506, and an Intrusion Detection System (IDS) 508. Traffic 502 passes through the access point 504, and may or may not pass through the network 506, as well.

In the example of FIG. 5, the access point 504 includes a radio interface 510, a monitor 512, and one or more filters 514-1 to 514-N (hereinafter collectively referred to as filters 514). Monitors, or snoop filters, are implemented per radio. Although a single radio interface is depicted in FIG. 5, it should be noted that in alternative embodiments, multiple radios may be associated with the access point 504. In an embodiment, if the radio interface 510 is disabled, transmit is blocked, but not receive. In an embodiment, filters 514 mapped to a disabled radio interface 510 will capture data.

In a non-limiting embodiment, TZSP is used to encapsulate 802.11 packets. Packets are captured after they are decrypted on the radio interface 510, so the payload is 'clear' even when the 802.11 header indicates encrypted data. In a non-limiting embodiment, a radio mac may be added to a TZSP header. In an embodiment, ethereal (e.g., ethereal 0.10.8 or later) may be installed on the IDS 508. Ethereal (and, as another example, tethereal) decode 802.11 packets embedded in TZSP without any configuration. Netcat, for example, may also be installed on the IDS 508, which allows the IDS 508 to listen to UDP packets on the TZSP port. This avoids a constant flow of ICMP destination not reachable messages from the observer back to the radio interface 510. If running on a computer, a tcl script can be used instead.

In the example of FIG. 5, the monitor 512, which may include a sniffer or snooper, and the radio interface 510 are integrated into a single device (the access point 504). In an embodiment, the monitor 512 and the radio interface 510 are integrated to facilitate decoding encrypted data and reporting accurate signal strength measurements. The access point 504 knows what it sees as the Relative Signal Strength Indicator (RSSI) and Signal to Noise Ratio (SNR) for client packets. When the monitor 512 sees a match on the radio interface 510, it copies the packet and sends it to the IDS 508. In some cases, the packet will flow directly from the monitor 512 to the IDS 508 without passing through a wireless exchange switch (see, e.g., FIG. 1).

In a non-limiting embodiment, the monitor 512 is persistent. Also, the mapping of the filters 514 to the radio interface 510 is persistent, though the enabled/disabled state of the filters 514 is not persistent. Accordingly, if the access point 504 is reset, the monitor 512 will be disabled until enabled by a user. In an alternative embodiment, it may be desirable to allow enabled state of the filters 514 to be persistent. In an embodiment with multiple radio interfaces in the access point 504, the filters 514 may be applied to any or all of the radio interfaces.

In the example of FIG. 5, the filters 514 are used by the monitor 512 to block un-interesting packets from the IDS 508. The filters 514 may include: Basic Service Set Identifier (BSSID), channel, mac address, frame-type, or some other parameter or value. In an embodiment, one filter can be mapped to any number of access points (not shown) that are controlled by the same switch or cluster of switches. For example, all packets to and from a client-mac can be captured as the client roams through a wireless domain. Snap-length is used to block un-interesting portions of packets from the IDS 508 (e.g., headers w/out payload).

In operation, the monitor 512 may selectively capture a packet from the traffic 502. The packet may be, by way of example but not limitation, an 802.11 packet. If the packet matches one of the filters 514, the monitor 512 copies the packet to the IDS 508. In this way, the monitor 512 can be used to block uninteresting traffic from the IDS 508. In an embodiment, the monitor 512 can also be used to block uninteresting portions of packets from the IDS 508 (e.g., send headers without any payload). In a non-limiting embodiment, it may be desirable to restrict ip-addr selection to prevent snooped packets from using the radio interface 510.

Figure 6:
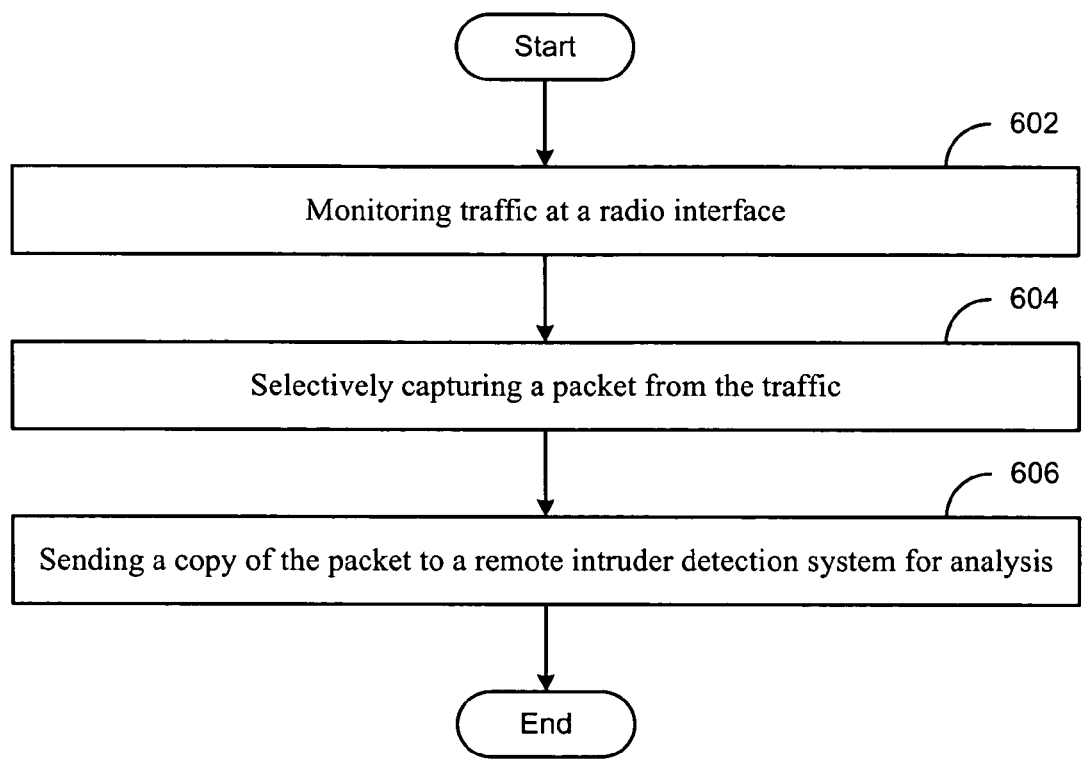
FIG. 6 depicts a flowchart of a method for remote monitoring in a wireless network.

FIG. 6 depicts a flowchart 600 of a method for remote monitoring in a wireless network. FIG. 6 is intended to illustrate remote monitoring using the techniques described herein, such as by using a remotely located IDS. The modules of FIG. 6 could be combined with the modules of FIG. 3 to, for example, describe a method for remote monitoring of a mobile device in a wireless network.

In the example of FIG. 6, the flowchart 600 starts at module 602 with monitoring traffic at a radio interface. The flowchart 600 continues at module 604 with selectively capturing a packet from the traffic. The flowchart 600 ends at module 606 with sending a copy of the packet to a remote intruder detection system for analysis.

Command Line Interface (CLI)

Some of the functionality of snoop may be shown by describing commands that are entered into a CLI in a specific implementation.

```
set snoop <filter> {condition-list} {observer <ip-addr>
                    {snap-length <value>}}
```

<filter> may be a unique name.

{condition-list} includes an operator and a packet value. In a non-limiting embodiment, the operator is 'eq' or 'neq'. Other embodiments may include other operators (e.g., 'lt', 'gt'). The packet value is a component of an 802.11 packet (bssid, src-mac, frame-type, . . . ). All conditions must be true for a packet filter to match. In a non-limiting embodiment, if the condition list is omitted, all packets are captured. In another non-limiting embodiment, the condition list is a collection of 'AND' conditions and multiple filters are used for 'OR' conditions. In a non-limiting embodiment, up to 8 conditions can be listed in a single filter, such conditions may include, by way of example but not limitation:

```
frame-type <oper> <control | management | data | beacon | probe>
channel <oper> <channel>          traffic received on a channel
bssid <oper> <bssid>              traffic with a bssid
src-mac <oper> <mac-addr>         traffic from a station
dest-mac <oper> <mac-addr>        traffic to a station
host-mac <oper> <mac-addr>        traffic to or from a station
mac-pair <mac1> <mac2>            traffic between two stations
                                  <oper> is implied 'eq'
```

{observer <ip-addr>} sets the address to which snoop sends packets after encapsulating matching packets in TZSP. If no observer is given, the radio simply counts matching packets. In an embodiment, this can augment regular radio statistics.

{snap-length <value>} is the maximum size of the packet contained in TZSP. Values over 100 bytes are rarely needed since typical debug involves protocol analysis of packet headers, but not payload. Large frames waste time on the access points to copy the entire packet. A small snap-length also reduces network congestion caused by packets flowing to the observer. In a non-limiting embodiment, if the snap-length is omitted, the entire packet is captured.

show snoop info <filter>

This command displays the configuration of a selected filter or all filters.

clear snoop <filter>

This command deletes a filter and clears its reference from daps.

set snoop map <filter> dap <dap-num> radio <radio-num>

This command maps a filter to a radio. One snoop filter may be applied to many radios. In this non-limiting implementation, up to 8 snoop filters can be applied to the same radio. Filters on each radio are arranged by the observer. Once a packet matches a filter for one observer, the remaining filters for that observer are ignored to avoid duplicate packets. If there is no observer, the filter is only a counter. Snoop filters with counters are always evaluated (multiple counters can be incremented with the same packet).

show snoop map <filter>

This command lists all daps mapped to one filter.

show snoop

This command, for all daps, lists all mapped filters.

show dap config <dap-num>

This command shows the list of snoop filters mapped to this radio.

clear snoop map <filter> dap <dap-num> radio <radio-num>

This command removes a filter from a radio.

clear snoop map all

This command clears all filter/radio mapping.

set snoop <filter> mode <enable {stop-after <value>| disable>

This command starts or stops a filter on all mapped radios. You can use 'all' in place of <filter> to enable or disable all filters. If stop-after is given, the filter is stopped after a number of matched packets. An active filter creates additional load for the access point and snooped packets can cause network congestion. This may destabilize the access point, so, in a non-limiting implementation, snoop filter state is not persistent.

If the access point is reset, all its filters will remain stopped until started by the user. When the enable command is issued, a message is sent to all operational radios with the filter. If the filter hasn't been mapped to any radios, an error is reported. When a filter is changed or when the radio state is reset, the filter is disabled. The expectation is that if you change a filter, you may also want to change the radio mapping before starting packet capture.

If active scan is enabled in the radio profile, snoop will capture traffic on other channels. The dwell-times are much longer when active scan is enabled on a disabled radio. In most cases, it's best to either disable active scan or include a condition such as 'channel eq 1' in the snoop filter to avoid capturing irrelevant data.

show snoop stats {<filter>{<dap-num> radio <radio-num>}}

This command shows stats and running state of all filters on all radios, all radios with a filter, or of a single filter/radio.

Examples of display stats for a filter include:

| | |
|---|---|
| Rx Match | number of packets received by radio matching the filter |
| Tx Match | number of packets sent by radio matching the filter |
| Dropped | number of matching packets not forwarded to observer due to memory or network problems |
| Stop-After | 'running' if enabled, 'stopped' if disabled, or remaining number of packets before filter disabled |

Stats are cleared whenever a filter is changed or re-enabled.

show configuration area snoop

This command displays the commands to produce all filters. With a little cut-and-paste you can selectively edit the condition list for a filter.

show configuration area ap

This command displays snoop filter references (created with 'set snoop map'), which are stored in the dap configuration.

Snoop filters may include the following:

| | |
|---|---|
| associated | ignore traffic from another network |
| src-ip | |
| dest-ip | |
| host-ip | |
| type | ether type: IP, ... |
| ip-protocol | UDP, TCP |
| src-port | |
| dest-port | |
| mac-range | host mac greater than xx, less than than yy |

Advantageously, using the techniques taught herein, it is possible to snoop packets while the access point (dap) is associating with a client and passing client data through the switch. Prior art has remote probes, but there is some guesswork in this approach since the RF environment at the probe is not identical to the RF at the access point. This problem is even more difficult when trying to trace all packets for a client as it roams from one access point to another.

As used herein, the term "embodiment" means an embodiment that serves to illustrate by way of example but not limitation. It may be noted that, in an embodiment, timestamps can be observed to measure roaming time.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
    a wired backbone network;
    a network, coupled to the wired backbone network;
    a wireless access domain, including:
        a first access area having
            a first wireless exchange switch for sending data through the network to the wired backbone network, and
            a first access point, with a first snoop filter, that links wireless mobile stations to the wired backbone network through the first wireless exchange switch;
        a second access area having
            a second wireless exchange switch for sending data through the network to the wired backbone network, and
            a second access point, with a second snoop filter, that links wireless mobile stations to the wired backbone network through the second wireless exchange switch;
    an intrusion detection system, coupled to the network, for analyzing packets;
    wherein, in operation, a connection is established between a mobile device in the first access area and the mobile device is associated with a persistent identity; the first snoop filter monitors traffic between the mobile device and the first access point and copies packets that meet a specified criteria to the intrusion detection system; when the mobile device moves into the second access area, the connection is maintained along with the persistent identity of the mobile device; the second snoop filter continues to monitor traffic between the mobile device and the second access point and continues to copy packets that meet the specified criteria to the intrusion detection system.

2. The system of claim 1 wherein the network provides a Layer 2 path for Layer 3, and wherein the first wireless exchange and the second wireless exchange send Layer 3 data through the network to the wired backbone network.

3. The system of claim 1, wherein the persistent identity includes a Layer 3 attribute.

4. A method comprising:
    establishing a wireless connection with a mobile device in a first access area of a wireless access domain, wherein the connection has an associated IP address;
    monitoring traffic associated with the mobile device through the first access area;
    capturing a packet from the traffic if the packet meets a specified criteria;
    analyzing the packet to determine whether the mobile device is a threat;
    detecting movement of the mobile device from the first access area to a second access area of the wireless access domain;
    maintaining the wireless connection and the associated IP address;
    continuing to monitor traffic associated with the mobile device through the second access area.

5. The method of claim 4, further comprising encapsulating the packet with TZSP.

6. The method of claim 4, further comprising decrypting packets so that a header associated with the packet is clear even if the header indicates encrypted data.

7. The method of claim 4, further comprising decoding encrypted data and reporting accurate signal strength measurements.

8. A system comprising:
    an access point, including:
        a radio interface through which wireless traffic passes;
        one or more filters;
        a monitor, coupled to the radio interface, that captures a packet from the wireless traffic if the packet matches a filter of the one or more filters;
    an intrusion detection system for analyzing packets;
    a network coupling the access point to the intrusion detection system, wherein the captured packet is copied through the network from the access point to the intrusion detection system.

9. The system of claim 8, wherein the intrusion detection system is remote with respect to the access point.

10. The system of claim 8, wherein the monitor appends radio information to the packet.

11. The system of claim 8, wherein the access point is a first access point, further comprising a second access point, wherein a mobile device is capable of passing from the first access point to the second access point with subnet mobility.

12. The system of claim 8, further comprising a workstation with the intrusion detection system included therein.

13. The system of claim 8, further comprising additional radio interfaces, wherein the monitor captures packets from traffic passing through the additional radio interfaces.

14. The system of claim 8, further comprising additional radio interfaces, wherein the one or more filters are mapped to each of the additional radio interfaces.

15. The system of claim 8, wherein the radio interface decrypts the packet such that the payload is clear even if a header indicates encrypted data.

16. The system of claim 8, wherein the radio interface and the monitor are integrated together into the access point.

17. The system of claim 8, wherein the monitor is persistent.

18. The system of claim 8, wherein the filters include one or more parameters selected from the group consisting of Basic Service Set Identifier (BSSID), channel, mac address, frame-type.

19. The system of claim 8, wherein the filters are non-persistently enabled/disabled.

20. The system of claim 8, wherein the packet is an 802.11 packet.

\* \* \* \* \*

UNITED STATES PATENT AND TRADEMARK OFFICE
CERTIFICATE OF CORRECTION

| | |
|---|---|
| PATENT NO. | : 7,573,859 B2 |
| APPLICATION NO. | : 11/326966 |
| DATED | : August 11, 2009 |
| INVENTOR(S) | : Taylor |

Page 1 of 1

It is certified that error appears in the above-identified patent and that said Letters Patent is hereby corrected as shown below:

In column 3, line 36, delete "FIG. 3" and insert --FIGS. 4, 5, and 6--, therefor.

Signed and Sealed this

Sixteenth Day of February, 2010

David J. Kappos
*Director of the United States Patent and Trademark Office*